United States Patent [19]
Paculat

[11] 3,760,169
[45] Sept. 18, 1973

[54] INTERFACE SYSTEM FOR DIRECT NUMERIC CONTROL OF AUTOMATIC WIRING MACHINES

[75] Inventor: Robert E. Paculat, Chicago, Ill.

[73] Assignee: GTE Automatic Electric Laboratories, Incorporated, Northlake, Ill.

[22] Filed: Sept. 18, 1972

[21] Appl. No.: 290,037

[52] U.S. Cl............... 235/151.1, 140/1, 235/151.11
[51] Int. Cl............................................ G06f 15/46
[58] Field of Search.................................. 140/1-2, 140/112-113; 156/349-351, 367, 598; 228/8, 18, 45, 57; 235/151.1, 151.11; 317/99, 122

[56] References Cited
UNITED STATES PATENTS 3,514,835  6/1970  Etchison et al......................... 140/1
3,626,385  12/1971  Bouman.......................... 235/151.11

Primary Examiner—Felix D. Gruber
Assistant Examiner—R. Stephen Dildine, Jr.
Attorney—K. Mullerheim et al.

[57] ABSTRACT

An electronic system for interfacing a plurality of automatic wiring machines with a process control computer such as to permit direct numeric control of the machines. The interfacing system automatically calls up wiring machine instructions from the computer and presents the instruction data to the wiring machine in accordance with initial condition information provided via an operator control console. A provision is made for sensing the completion of a given level of wiring and interrupting operation prior to proceeding to the next wiring level.

21 Claims, 4 Drawing Figures

INTERFACE SYSTEM FOR DIRECT NUMERIC CONTROL OF AUTOMATIC WIRING MACHINES

BACKGROUND OF THE INVENTION

1. Field of the Invention

The present invention relates generally to the field of controlling the operation of machines and more particularly to a system for interfacing a process control computer with a plurality of automatic wiring machines to provide direct numeric control thereof.

2. Description of the Prior Art

In the manufacture of complex electronic systems it has become commonplace to employ automatic wiring machines to perform backplane wiring on large blocks of electrical connectors. Prior to the present invention each automatic wiring machine was provided with an input device such as a card reader. A card deck containing the instructions for wiring one backplane would be placed in the reader which would then control the wiring machine operation in wiring the part for which the card deck had been generated. The primary problems with this approach arise from the handling and storage of the cards and maintenance of the card reader itself.

OBJECTS AND SUMMARY OF THE INVENTION

From the preceding discussion it will be understood that among the various objectives of the present invention are included the following:

the provision of a new and novel electronic system for interfacing a process control computer with a plurality of automatic wiring machines;

the provision of apparatus of the above-described character which permits fully automatic direct numeric control of the wiring machine operation; and the provision of apparatus of the above-described character which detects completion of wiring at a given level.

These as well as other objectives of the present invention are efficiently achieved by providing a process control computer having stored therein the wiring machine control instructions for the wiring of various parts which may be required to be wired. The computer is coupled via a common data highway to a plurality of electronic interfacing systems associated with a like plurality of automatic wiring machines. Each interfacing system is provided with an operator control unit on which initial operating conditions may be set and operation of the system may be monitored. The interfacing system in operation initiates the transfer of control data from the computer and transfers this data to the automatic wiring machine at a compatible rate. The interfacing system also operates to detect the completion of one of a plurality of wiring levels and interrupt operation of the system such that an inspection may be performed.

The foregoing as well as other objects, features and advantages of the present invention will become more apparent from the following detailed description taken in conjunction with the various views of the appended drawings.

DESCRIPTION OF PREFERRED EMBODIMENT

Figure 1:
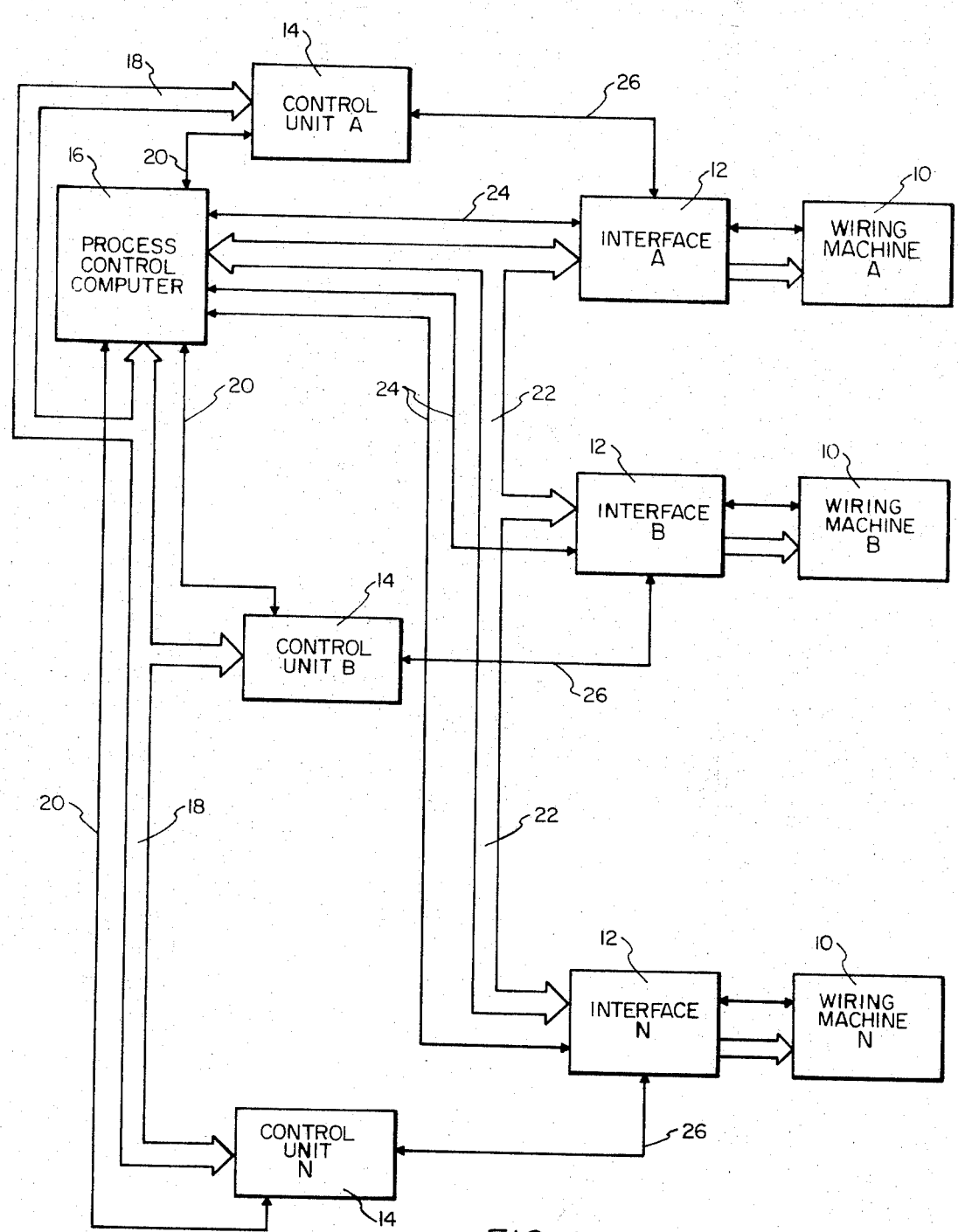
FIG. 1 is an overall block diagram of a plurality of direct numeric controlled automatic wiring machines indicating the general relationship of the present invention to the process control computer and wiring machines.

Turning now to FIG. 1 there is shown a plurality of automatic wiring machines 10, each provided with an interface unit 12 which is in turn coupled to a control unit 14 and to a process control computer 16. All operator communication between the control unit 14 and computer 16 is via a first 16 bit highway 18 and direct wired paths 20. Each interface unit 12 is coupled to the computer 16 by a second common 16 bit highway 22 as well as wired paths 24 and to its associated control unit by wires 26. The common 16 bit highway 22 is connected to an electronic contact operate group within the computer and in parallel to all interface units. Wiring machine control data is stored in and controlled by the process control computer 16 and is available to any automatic wiring machine 10 equipped with an interface unit 12. A plurality of programs, each corresponding to a different backplane to be wired, are stored in the computer memory. Each program comprises a series of data blocks each of which includes the information necessary to control the wiring machine 10 in connecting and routing one wire. Each data block is called-up from the memory on a per-word basis and transmitted to the interface unit 12 on receipt of a data demand signal as will be described in more detail hereinbelow.

It will be apparent that in practice the process control computer 16 may be duplicated such that in case of the failure of the primary computer driving a particular group of wiring machines, the control may be automatically switched to a back-up system. Through the use of a common highway technique for data transfer considerable flexiblity is provided since expansion may be accomplished by merely adding cable extensions to each additional machine 10 equipped with an interface unit 12. In practice, the principles of the present invention as hereinafter described will apply generally to any type of process control computer and automatic wiring machine. For convenience in describing an illustrative embodiment of the invention, an International Business Machines Inc. Model 1800 series process control computer and a Model 14F–22×22×Universal-E Wire Wrap machine which is commercially available from the Gardner-Denver Company, Wire-Wrap Division of Grand Haven, Michigan may be assumed.

It will be understood that the present invention is concerned with interfacing a wiring machine with the process control computer. The means whereby the control data presented via the interface unit to the wiring machine is translated into actual machine responses is considered to be part of the wiring machine and not part of the interface unit.

Figure 2:
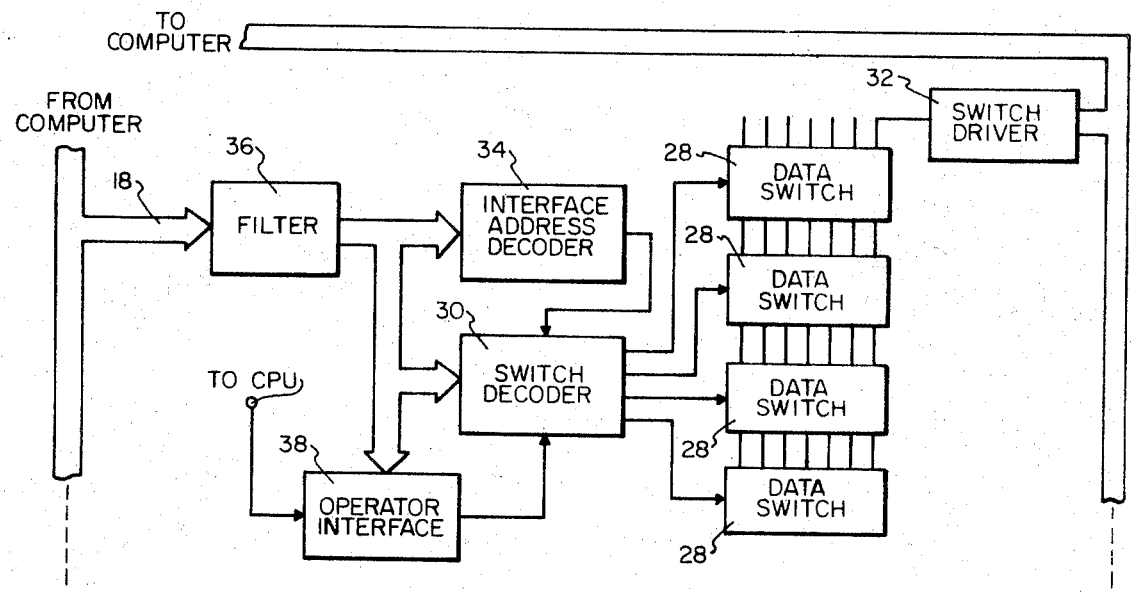
FIG. 2 is a schematic block diagram of the control unit of FIG. 1.

FIG. 2 illustrates in schematic block form a control unit for use in the practice of the present invention. Each control unit is provided with a plurality of data switches 28 which may be set by an operator to identify such items as the part number of the backplane which is to be wired, the part issue number, the wiring mode (e.g., one wire at a time, etc.), and the initial conditions under which wiring is to be started (i.e., at the beginning or some intermediate step). The control unit will also be provided with a plurality of indicators which are driven by the interface unit and will be described in conjunction therewith. The data switches 28 are arranged in groups, each switch in a group being coupled to a switch decoder 30 and a switch driver 32. Each switch decoder is in turn coupled to an interface address decoder 34. The interface address decoder 34 is essentially a binary decoder which has only one of its outputs (i.e., that address which corresponds to that control unit) coupled to the switch decoder 30. The address decoder outputs may be coupled via a selector switch such that the unit address may be altered, however, it is preferred that the interface address not be an operator-selectable parameter. The control unit is addressed by the computer via the common highway 18 and input filter 36, in response to a call for service signal from the operator interface 38 and the switch settings are read. In practice the data switches 28 are preferred to be of the thumbwheel type whereby the appropriate data may conveniently be set by the operator. If the data switch information content is invalid (e.g., a part number, issue number or wiring mode is invalid) the computer may generate an appropriate command to actuate an error indicator.

Figure 3:
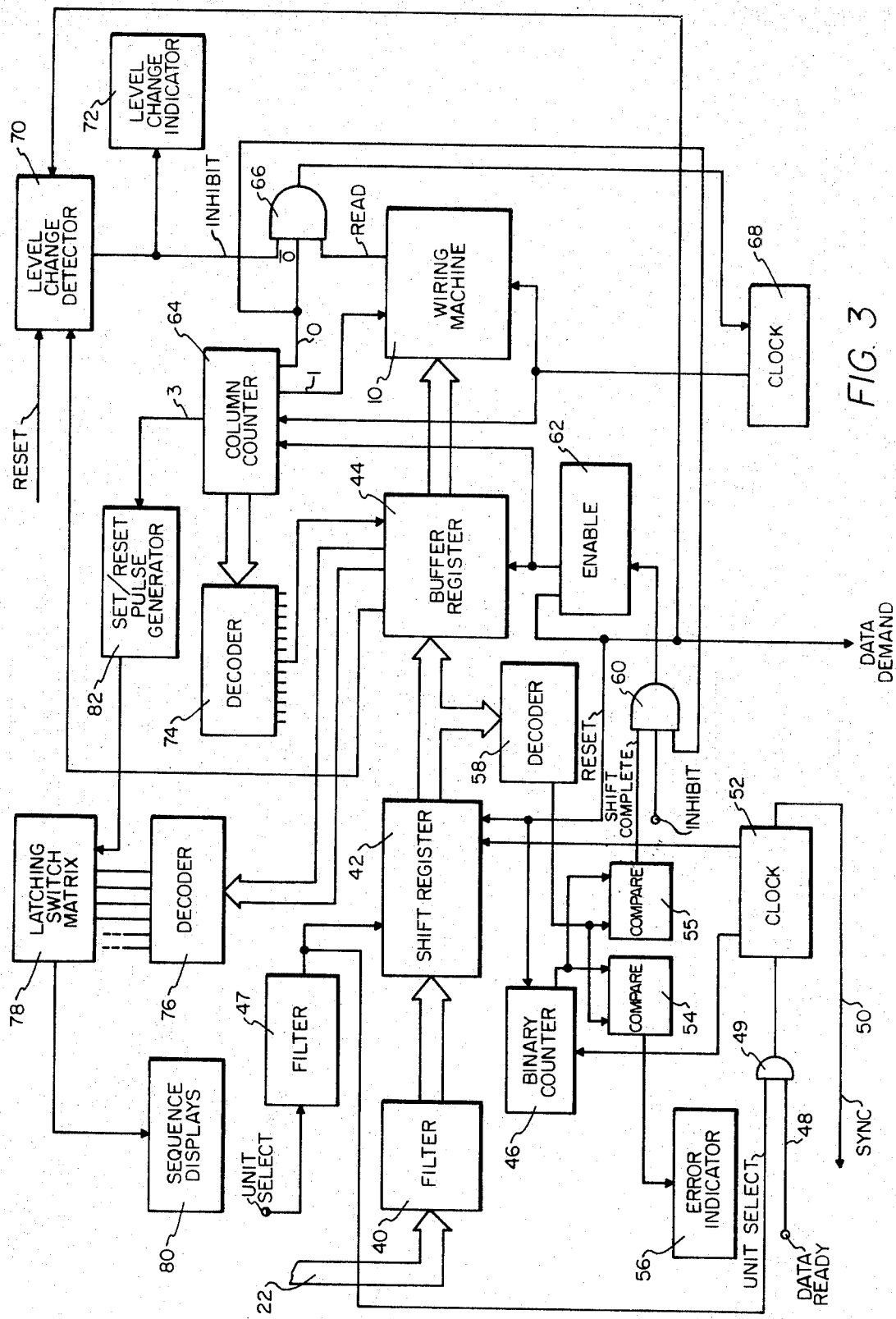
FIG. 3 is a schematic block diagram of the interface system of FIG. 1.

The term data block as used herein means all information necessary to control the wiring machine in placing one wire as well as the control and checking information. One data block is made up of 17 16-bit words. FIG. 3 schematically illustrates the interface unit of the present invention wherein the basic data flow from the central processing unit is via common highway 22 and input filter 40 to a 16 word shift register 42. Data is sequentially transferred through a buffer register 44 to the automatic wiring machine 10.

The first of the 17 16-bit words is a "unit select" word whereby the interface unit is uniquely addressed after a call for service from that unit. This first word is "decoded" in the process control computer such that one of the "unit select" wires from the computer to the individual interface units is grounded to thereby indicate which of the plurality of interface units is being addressed. Although this first word is considered a part of each data block it is not processed through the interface unit as are the following words. The unit select signal is applied via input filter 47 to precondition the input shift register 42 to receive data and also to one input of AND gate 49.

The data flow from the computer is controlled by the "data ready" 48 and "sync" 50 leads. Whenever the computer has a word of information ready to be transmitted, the voltage pulse is applied at the input of AND gate 49. Gate 49 provides an output pulse only when a data word is available for transmission to that interface unit which is selected by the first or "unit select" word. The output of gate 49 is used to trigger a clock 52 such that a clock generated pulse is coupled to the shift register 42 and to a binary counter 46. Since an information data block is 17 words and the actual data is only 16 words the first clock pulse is used to enable the following data pulses to the shift register 42. Clock 52 also operates to generate a "sync" pulse on lead 50 which indicates that a data word has been accepted. Clock pulses are thus generated as each word of each data block is transmitted to the interface unit from the computer.

The second word of each data block is used to enable the interface unit and to precondition a binary counter 46 and is preferably made up of all logical "1's." The third through sixteenth words comprise the binary wiring instructions for the wiring machine 10. The seventeenth word is a four digit binary coded decimal (16-bits) computer generated word which is identical to the wire sequence number in the information data block.

Each word of the data block is transmitted from the computer via highway 22 and filter 44 to shift register 42. As each word is entered a pulse from clock 52 is coupled to the input of binary counter 46 such that when the shift register 42 has been loaded with the full 16 words the counter will provide an output signal. After all 17 words of the data block have been processed (assuming no errors) the sixteenth position in shift register 42 will have all logical "1's" registered in it. The content of this sixteenth position is decoded by decoder 58 which will have an output only when all bits at that position are logical "1's." At the end of the sixteenth clock pulse (seventeenth sync pulse) the outputs of the binary counter 46 and decoder 58 are coupled to a first comparison circuit 54 comprising an exclusive OR gate. Thus, should either the number of words stored in shift register 42 or the content of the first of those stored words be in error, an output signal is coupled to a suitable error indicator 56 located at the control unit. The outputs from counter 46 and decoder 58 are also coupled to a second comparison circuit 55 (e.g., an AND gate) which will have an output only when both the number of words entered into shift register 46 and the content of the first of those stored words are correct. The output of the second comparison circuit 55 is coupled to one of AND gate 60 as a "shift complete" indicating signal. The output of gate 60 is coupled to an enable circuit 62 such that during the last clock pulse when a complete block of valid data is stored in shift register 42 an enabling pulse is coupled to buffer register 44. The data presented at the output of shift register 42 is then transferred into buffer register 44. The enabling circuit 62 also operates to produce another output pulse which is coupled back to the computer to indicate that the preceding data block has been transferred out of shift register 42 and the next data block may be transmitted. The enabling circuit 62 output pulse is further coupled as a reset pulse to the shift register 42 and binary counter 46 as well as to a column counter 64. The column counter 64 comprises a binary counter and a binary coded decimal decoder for columns 0, 1 and 3 of buffer register 44. As the initial data word is transferred from shift register 42 to buffer register 44 the output to enable circuit 62 advances the column counter 64 from 0 to 1.

When the automatic wiring machine 10 is cleared and idle the column counter will be set at zero and a "read" voltage will be coupled from the automatic wiring machine 10 to one input of AND gate 66 together with the inverted voltage from the column 0 output of counter 64 (i.e., $\overline{0}$). When these signals areec both present at the inputs of gate 66 an output pulse is applied to a clock 68 having its output coupled to the automatic wiring machine and to the column counter 64. The pulses from clock 68 serve to advance counter 64 in unit increments from 1 through 16 and back to 0. 2

WHen the buffer register 44 is loaded and the column counter 64 is thus set to count 1, a field mark signal is presented via the column 1 output lead to the wiring machine 10 indicating that the instructions for connecting and routing a wire are available (i.e., the information equivalent of one instruction card in a card reader is in position) and enabling the "read" signal from the wiring machine. The output of the column counter 64 is coupled to decoder 74, which comprises a set of 16-bit data selectors, operating to transfer the information equivalent of one column of punched card data at a time from the buffer register 44 to the wiring machine. Each succeeding "read" pulse from the wiring machine 10 operates via gate 66 and clock 68 to advance the column counter 64 by one until a return to zero at the end of 16 counts. When the counter again reaches zero another transfer of data into the buffer register 44 is initiated and the cycle is restarted for each new data block.

The sixteen bits of information stored in column 15 of buffer register 44 represent the sequence of the wire covered by the data block. This column of information is coupled to binary-coded-decimal to decimal decoders 76. The output leads of these decoders are each coupled to one terminal of one winding of a matrix 78 of magnetic latching reed switches, the contacts of which are coupled to a group of wire sequence displays 80.

When the column counter 64 reaches a count of three during transfer of instructions from the buffer register 44 to the wiring machine 10, an output voltage on the count-three lead triggers pulse generator 82 to generate a reset pulse to clear the preceding sequence display followed by a set pulse which stores the converted sequence number of the wire in the process of being routed in the latching switch matrix and presents this number to the sequence displays 80. The reset/set pulses may conveniently be provided by two one shot multivibrator circuits. Since the displayed information is changed at the time the third data column is being processed, it will not change until a successful wire routing and connection has occurred, even though the next succeeding data block has been partially processed. Since the sequence information is preferably stored with magnetic latching reed switches, a power failure or other type of shutdown will not destroy the stored data and a restart may be accomplished without difficulty.

Many electronic backplanes are wired on several levels; i.e., a given terminal may have several wires connected to it. It is therefore desirable to interrupt the wiring process at the completion of each wiring level for inspection purposes. In this manner any repairs may be made to the part being wired before the next level of wiring is placed over the preceding level.

When each data block is transferred into buffer register 44 a voltage pulse representing the level in the backplane at which the wiring machine is operating is coupled from the buffer register 44 to a level change detector circuit 70. When the wiring of one level is completed the input to the level change detector 70 will change and an output voltage generated and applied as an inhibit signal to AND gate 66 as well as used to activate a level change indicator 72. When an inhibit signal is applied to AND gate 66 further transfer of wiring instructions to the wiring machine 10 is prevented. The wiring operation is thus interrupted to permit the completed wiring level to be inspected prior to wiring the next level. Since shift register 42 is cleared each time a request for service is made via the control unit, the level change detector circuit 70 is inhibited for the first data block as well as during the actual wiring level pulse. The level change detector 70 may be reset when the wiring processes are restarted after inspection by a reset voltage pulse applied from the operator interface.

Figure 4:
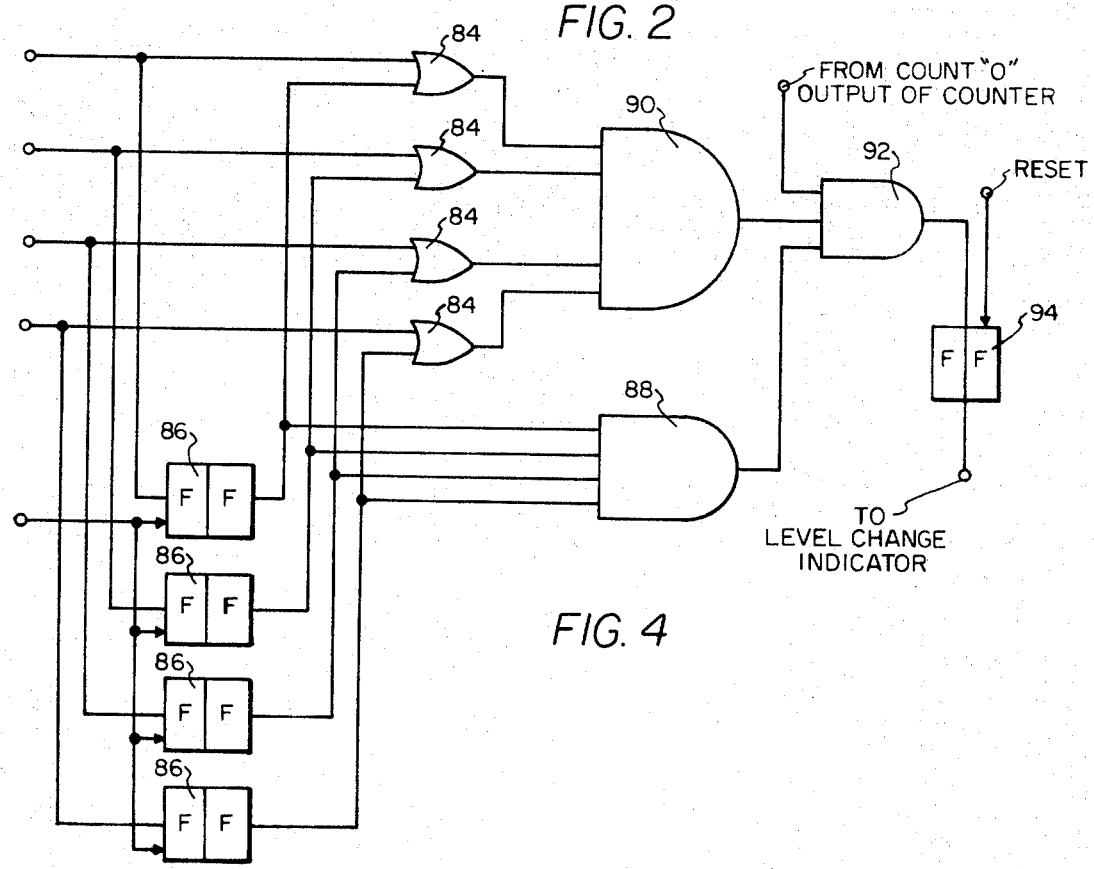
FIG. 4 is a schematic diagram of the level change detector circuit shown in FIG. 2.

FIG. 4 is a schematic illustration of a level change detector circuit of utility in the interface unit of FIG. 3. Four bits of the third word in the data block (second word stored in the buffer register) contain the wiring level information and are thus coupled from the buffer register to the inputs of four exclusive OR gates 84 and together with a pulse from enabling circuit 62 through four flip-flop circuits 86 to the other inputs of gates 84. The outputs of flip-flops 86 are also coupled to the inputs of AND gate 88. If both inputs of the exclusive OR gates are the same no change in wiring level is indicated and no output voltage will be present. If, however, the wiring level changes from one data block to another the gates will have an output. The outputs of gates 84 are coupled to AND gate 90 which will have an output only when any bits of the wiring level data change. The outputs of AND gates 88 and 90 are coupled together with the count-0 output of the column counter 64 (FIG. 3) to the inputs of AND gate 92. The output of gate 92 is coupled through flip-flop circuit 94 to provide the level change detector output. The level change detector reset pulse from the operator interface is applied to flip-flop 94.

From the preceding description it will be seen that the applicant has provided a new and novel apparatus for the direct numeric control of automatic wiring machines wherein the objectives set forth above are efficiently met. Since certain changes in the above-described construction will occur to those skilled in the art without departure from the scope of this invention it is intended that all matter contained in the description or shown in the appended drawings shall be interpreted as illustrative and not in any limiting sense.

Having described what is new and novel and desired to secure by Letters Patent, what is claimed is:

1. In combination a plurality of automatic wiring machines each adapted to receive and to operate in response to digital control data organized in a plurality of data blocks, and a process control computer having said digital control data for each of said plurality of wiring machines stored therein, a plurality of electronic interface units, one coupled between each said wiring machine and said computer for selectively transferring said digital control data from said computer to said wiring machines, each said interface unit comprising means for signalling said computer to thereby initiate a transfer of a block of said digital control data from said computer to said interface unit and for receiving signals from said computer indicating the availability of a block of said digital control data for transfer to said interface unit, first means for receiving and temporarily storing a block of said digital control data, means coupled to said temporary storage means for verifying the accuracy of the data received by said first temporary storage means and operating to generate an output signal when said data is verified as accurate, second means coupled to said first temporary storage means and to said verifying means for receiving and temporarily storing said block of digital control data in response to an output signal from said verifying means, means coupled to said wiring machine and to said second temporary storage means for sequentially transferring portions of said block of digital control data to said wiring machine.

2. Apparatus as recited in claim 1 wherein
all said interface units are coupled to said computer by a common data highway 3. Apparatus as recited in claim 1 further including a plurality of control units one coupled to each said interface unit and all coupled to said computer by a common data highway, each said control unit including a plurality of data switches the settings of which represent an initial operation to be performed by said wiring machine, means for said computer to individually address said control unit, and means for decoding said data switches to thereby indicate which of said blocks of digital control data stored therein are to be transferred from said computer to said wiring machine by said interface unit.

4. Apparatus as recited in claim 1 wherein
said first means for receiving and temporarily storing said digital control data comprises a shift register coupled to said common data highway,
said second means for receiving and temporarily storing said digital control data comprises a buffer register coupled between said shift register and said wiring machine, and
both said shift register and said buffer register having storage capacities equal to at least one block of said digital control data.

5. Apparatus as recited in claim 4 wherein
said signalling and receiving means comprises a first clock coupled to said computer and to said shift register and operating in response to a signal from said computer to generate an enabling pulse to enable the transfer of each word of said block of digital control data to said shift register, and in response to said transfer generate a signal to initiate the transfer of the next succeeding word to said shift register.

6. Apparatus as recited in claim 5 wherein
said data verifying means comprises a binary counter coupled to said clock and operating to count said enabling pulses and to produce an output only after having counted a number of pulses equal to the word capacity of said shift register, means coupled to the output of said shift register for decoding a selected one of said words temporarily stored therein, and providing an output only when said selected word content is equal to a preselected standard, and verification output means coupled to said binary counter and to said decoder and operating to produce an output only when an output from both said binary counter and said decoder are coupled thereto.

7. Apparatus as recited in claim 6 wherein
said verification output means comprises an AND gate.

8. Apparatus as recited in claim 6 further including error indicating means coupled to said binary counter
and to said decoder and operating to produce an error output signal when an output from only one of said binary counter and decoder is coupled thereto.

9. Apparatus as recited in claim 8 wherein
said error indicating means comprises an exclusive OR gate.

10. Apparatus as recited in claim 6 further including
an enabling means coupled to said verification output means and to said buffer register and operating in response to an output from said verification output means to provide an output signal to enable the transfer of said data block from said shift register to said buffer register.

11. Apparatus as recited in claim 10 wherein
said enabling means is further coupled to said shift register such that said output signal operates to condition said shift register to receive the next succeeding data block.

12. Apparatus as recited in claim 10 wherein
said enabling means is further coupled to said computer such that said output signal operates to indicate that said interface unit is in condition to accept the next succeeding data block.

13. Apparatus as recited in claim 10 wherein
said sequential transferring means includes means coupled to said enabling means, to said buffer register and to said wiring machine for sequentially enabling the transfer of each word of each block of digital control data stored in said buffer register to said wiring machine.

14. Apparatus as recited in claim 13 wherein
said sequential enabling means comprises a counter for sequentially identifying each word stored in said buffer register, a decoder coupled between said counter and each word storage portion of said buffer register, and a second clock coupled to said wiring machine and to said counter, said clock operating to advance said counter at a rate proportional to the rate at which said wiring machine may accept words of said digital control data, said counter providing a coded output at each count which is uniquely related to a corresponding word stored in said buffer register, and said decoder operating to decode each said coded output and enable the transfer of each said corresponding word of digital control data from said buffer register to said wiring machine.

15. Apparatus as recited in claim 14 wherein
said counter includes means for producing an output signal indicative of the completion of the transfer of all words stored in said buffer register to said wiring machine, said transfer completion signal being applied to said second clock to interrupt operation thereof and to said enabling means to thereby enable the transfer of the next succeeding data block from said shift register to said buffer register.

16. Apparatus as recited in claim 4 wherein
said wiring machine operates at a plurality of wiring levels, each of said wiring levels being identified by a selected portion of each of said data blocks, and further including
means coupled to said buffer register for detecting a change in said wiring level identifying portion of successive data blocks, and for producing an output signal indicative of such change.

17. Apparatus as recited in claim 16 wherein said wiring level change indicating signal is coupled to said sequential transferring means to thereby inhibit further transfer of said digital control data from said buffer register to said wiring machine.

18. Apparatus as recited in claim 4 wherein
each operation of said wiring machine is identified by a selected word of each said data block, and further including
means coupled to said buffer register for decoding the operation identifying word of each said data block, and means for indicating the identification of said operation.

19. Apparatus as recited in claim 18 wherein
said indicating means comprises a plurality of wire sequence displays and means coupled to said decoding means for selectively actuating that display corresponding to said wiring machine operation.

20. Apparatus as recited in claim 19 wherein
said selective actuating means comprises a switch matrix coupled between said decoding means and each of said displays.

21. Apparatus as recited in claim 20 wherein
said switch matrix is a latching switch matrix, and further including
means coupled between said sequential transferring means and said latching switch matrix for resetting said matrix after the completion of the transfer of each said data block from said buffer register to said wiring machine.

* * * * *